United States Patent [19]

Tsutsumi et al.

[11] Patent Number: 5,223,311
[45] Date of Patent: Jun. 29, 1993

[54] LAMINATE AND PROCESS FOR PRODUCING THE SAME

[75] Inventors: Katsuaki Tsutsumi; Shintaro Inazawa; Shin-ichi Yasuda, all of Ohita, Japan

[73] Assignee: Showa Denko K.K., Tokyo, Japan

[21] Appl. No.: 789,677

[22] Filed: Nov. 8, 1991

Related U.S. Application Data

[62] Division of Ser. No. 526,753, May 22, 1990, abandoned.

[30] Foreign Application Priority Data

May 22, 1989 [JP] Japan .................................. 1-128589
Nov. 24, 1989 [JP] Japan .................................. 1-306131

[51] Int. Cl.$^5$ .............................................. B05D 3/02
[52] U.S. Cl. .............................. 427/388.1; 427/389.9; 427/391; 427/393.5; 428/461; 428/475.8; 428/513
[58] Field of Search ............... 427/385.5, 388.1, 389.9, 427/391, 393.5; 428/461, 475.8, 513

[56] References Cited

U.S. PATENT DOCUMENTS

| | | | |
|---|---|---|---|
| 4,020,215 | 4/1977 | Michaylov | 428/516 X |
| 4,058,647 | 11/1977 | Inoue et al. | 428/474 |
| 4,440,911 | 4/1984 | Inoue et al. | 525/301 |
| 4,778,712 | 10/1988 | Akao | 428/516 X |

FOREIGN PATENT DOCUMENTS

| | | |
|---|---|---|
| 0016617 | 10/1980 | European Pat. Off. |
| 0035392 | 9/1981 | European Pat. Off. |
| 0308131 | 3/1989 | European Pat. Off. |
| 0312664 | 4/1989 | European Pat. Off. |
| 8606395 | 11/1986 | PCT Int'l Appl. |
| 2048903 | 12/1980 | United Kingdom |
| 2059340 | 4/1981 | United Kingdom |

*Primary Examiner*—Michael Lusigan
*Attorney, Agent, or Firm*—Sughrue, Mion, Zinn, Macpeak & Seas

[57] ABSTRACT

A laminate suitable for use as wrapping or packaging materials for foods and industrial materials is disclosed, which is produced by laminating a thermoplastic resin composition which comprises (1) 10 to 95 % by weight of an ethylene copolymer composed mainly of units derived from ethylene and units derived from an unsaturated carboxylic acid anhydride and (2) 70 to 5 % by weight of a flexible resin having an MFR (190° C.) of 0.1 to 1,000 g/10 min, to one or more kinds of substrates selected from thermoplastic resins, metals, papers, and fabrics. A process for efficiently producing the laminate is also disclosed.

10 Claims, No Drawings

LAMINATE AND PROCESS FOR PRODUCING THE SAME

This is a divisional of application Ser. No. 07/526,753 filed May 22, 1990, now abandoned.

FIELD OF THE INVENTION

The present invention relates to a laminate containing an ethylene copolymer and a process for producing the laminate. More particularly, it relates to a laminate which is less odorous and especially suited for use as a wrapping or packaging material for foods, etc. and also relates to a process for producing such a laminate.

BACKGROUND OF THE INVENTION

In the field of wrapping or packaging materials for foods and industrial materials and of automotive materials, single-substance materials have been unable to find their uses, and efforts have been exerted to develop composite materials, polymer alloys, and the like applicable to such fields. Although laminates are among these materials, the laminates produced so far do not necessarily have desired properties.

One of the major reasons for the above is that the adhesion between laminae may be insufficient because the respective laminae to be united into a laminate often have contradictory natures. In order to eliminate this problem, various kinds of adhesive resins have been proposed so far, but it has been difficult to always meet property requirements that are being diversified and becoming severe.

Polyolefins are used in various applications owing to their low cost, good mechanical strength, hygienic nature, and good formability. However, since they are poor in oil resistance and gas barrier properties, polyolefin packages for foods such as mayonnaise and soy sauce cannot preserve such foods over prolonged periods of time. In addition, polyolefin containers for gasoline are defective in that a large proportion of the gasoline in the containers permeates through the container walls and is lost, and that the containers are swollen by the gasoline to suffer deformation.

Although various proposals have been made so far for the purpose of eliminating these defects of polyolefins, the results are complicated production processes, increased costs, and limitations in use and design, so that satisfactory results have not been obtained.

Among such proposals are lamination of polyolefins to materials that compensate the defects of polyolefins, such as polyesters, polyamides, saponified ethylene-vinyl acetate copolymers, aluminum foil, glass, etc., and vapor deposition of metals or inorganic substances on polyolefins. However, polyolefins by nature have poor affinities for the above resins and inorganic substances due to their chemical structures and, hence, lamination of polyolefins to such substances is difficult. Although it has been proposed to provide an adhesive layer between laminae to solve the above problem, this newly necessitates a step of applying an adhesive, disadvantageously resulting in a complicated production process.

Well known as adhesive resins for use as laminae to be coated on supports are polyolefins which have been modified by grafting thereonto unsaturated carboxylic acids or anhydrides. However, laminates containing laminae of such modified polyolefins have still insufficient adhesion, so that lamina separation often occurs. Such laminates are also defective in that since the production process involves a modification step in addition to polymerization, production costs are raised.

Laminates containing polyolefin resins have conventionally been used as various kinds of wrapping or packaging materials because they are excellent in the properties required of wrapping or packaging materials, such as cost, handling properties, productivity, and heat-sealing properties. However, since polyolefin resins are nonpolar in themselves, laminating thereof to other kinds of materials has necessitated modification of the polyolefin resins by graft polymerization, flame treatment or corona discharge treatment of substrates, application of anchor coats on substrates, or other measures.

In the case where laminates containing polyolefin resin laminae are to be obtained by extrusion laminating, an extrusion-coating technique is often utilized which, for example, comprises applying a kind of adhesive called an anchor coat and then extrusion-coating a polyolefin resin. Use of anchor coats, however, is defective in that the solvents should be recovered to prevent pollution of the working atmosphere and that production efficiency, cost, safety, etc. are adversely affected. In addition, it is difficult to impart sufficient adhesion properties only by the application of an anchor coat, so that it has often been necessary to form polyolefin resins into sheet at exceedingly high temperatures (300° C. or higher) to oxidize the resin surface before the resins are processed into laminates.

Because of such production processes, the polyolefin resins in the final laminates have deteriorated to emit strong odors, so that the laminates cause problems when used as wrapping or packaging materials for foods.

In recent years, in particular, wrapping and packaging materials are required to meet requirements that are becoming more and more severe so as to eliminate the adverse influence of the materials on the smells, flavors, etc. of foods. Under such circumstances, an increasing number of laminates produced by conventional processes are being considered to be unusable.

Although the adverse influence on smells and flavors can be diminished to some degree by performing the processing of polyolefins at lower temperatures (280° C. or lower), this results in difficulties in producing good laminates because adhesion to the substrates is insufficient.

Another method for ensuring adhesion to substrates is to utilize copolymers of ethylene and polar comonomers as the polyolefin resin. This method is being extensively employed.

As such copolymers, use is made of ethylene-ethyl acrylate copolymers, ethylene-acrylic acid copolymers, ethylene-methacrylic acid copolymers, ethylene-ethyl acrylate-maleic anhydride copolymers, and the like. However, these copolymers have strong odors attributable to the comonomers although they show improved low-temperature adhesion, so that it is difficult to produce, even at low temperatures, laminates usable for food wrapping or packaging. The applications of such laminates may be widened to some extent by washing those copolymers with solvents, etc. to remove substances that cause the odors.

However, the above method is not efficient because the production of such copolymers is quite costly, since large-scale equipments are necessary to washing with solvents and recovery of the solvents and care should be taken because of the toxicity and flammability of the solvents.

The dry lamination method, among laminate-producing processes besides the extrusion laminating, can yield laminates with good properties. The dry lamination process, however, is inferior to the extrusion laminating in working efficiency and production cost, and is hence not an efficient process.

SUMMARY OF THE INVENTION

The first object of the present invention is to provide a laminate which has an advantage of low cost and is suited for use in the field of wrapping or packaging materials for foods and industrial materials and in the field of automotive materials, and which may be a coextrusion-laminated, extrusion-laminated, hot press-laminated, or blow-molded laminate in which both laminae are tenaciously bonded to each other without use of adhesives.

The second object of the present invention is to provide a process for efficiently producing the laminate which is less odorous, has high interlaminar bonding strength, and is hence suitable for use as a wrapping or packaging material for foods.

The present inventors have conducted intensive studies and, as a result, it has now been found that the first object of this invention is accomplished by a laminate produced by laminating a thermoplastic resin composition which comprises (1) 10 to 95% by weight of an ethylene copolymer composed mainly of units derived from ethylene and units derived from an unsaturated carboxylic acid anhydride and (2) 70 to 5% by weight of a flexible resin having an MFR (190° C.) of 0.1 to 1,000 g/10 min, to one or more kinds of substrates selected from thermoplastic resins, metals, papers, and fabrics.

The present inventors have further made studies of various processes for producing the laminate. As a result, it has been found that a laminate can be efficiently produced by an extrusion laminating process in which an ethylene copolymer composed mainly of units derived from ethylene and units derived from an unsaturated carboxylic acid anhydride is extrusion-coated on a substrate at a temperature not higher than 280° C. The present invention has been completed based on the above.

DETAILED DESCRIPTION OF THE INVENTION

The unsaturated carboxylic acid anhydride used for producing the ethylene copolymer employed in this invention preferably has up to 24 carbon atoms, and examples thereof include radical-polymerizable acid anhydrides (hereinafter often referred to as a radical-polymerizable acid anhydride) such as maleic anhydride, itaconic anhydride, endic anhydride, citraconic anhydride, propenylsuccinic anhydride and dodecenylsuccinic anhydride. Of these, maleic anhydride and itaconic anhydride are particularly preferred. If desired, two or more of those anhydrides may be used in combination. In the case that the unsaturated carboxylic acid anhydride has an organic group containing a radical-polymerizable group, the radical-polymerizable group is preferably located at the end of the organic group.

Since such radical-polymerizable acid anhydrides are poor in homopolymerizability although copolymerizable to some degree, copolymerization of the anhydrides with ethylene is less apt to yield oligomers etc. that are the cause of odors, so that the resulting copolymers are scarecely odorous.

The ethylene copolymer may contain, besides units derived from the unsaturated carboxylic acid anhydride, units derived from a polymerizable monomer as the third ingredient. Examples of the third monomer include esters, amides, acids, ethers, and hydrocarbon compounds.

Specific examples of the esters include vinyl acetate, methyl acrylate, ethyl acrylate, propyl acrylate, butyl acrylate, hexyl acrylate, octyl acrylate, lauryl acrylate, benzyl acrylate, allyl acrylate, 2-hydroxyethyl acrylate, 2-hydroxypropyl acrylate, N,N-dimethylaminoethyl acrylate, aminoethyl acrylate, butanediol diacrylate, hexanediol diacrylate, triethylene glycol diacrylate, tetraethylene glycol diacrylate, polyethylene glycol diacrylate, methyl methacrylate, ethyl methacrylate, propyl methacrylate, butyl methacrylate, hexyl methacrylate, octyl methacrylate, lauryl methacrylate, benzyl methacrylate, 2-hydroxyethyl methacrylate, 2-hydroxypropyl methacrylate, N,N-dimethylaminoethyl methacrylate, aminoethyl methacrylate, allyl methacrylate, butanediol dimethacrylate, hexanediol dimethacrylate, triethylene glycol dimethacrylate, tetraethylene glycol dimethacrylate, polyethylene glycol dimethacrylate, monomethyl fumarate, monoethyl fumarate, monopropyl fumarate, monobutyl fumarate, monomethyl maleate, monoethyl maleate, monopropyl maleate, monobutyl maleate, dimethyl fumarate, diethyl fumarate, dipropyl fumarate, dibutyl fumarate, dimethyl maleate, diethyl maleate, dipropyl maleate, and dibutyl maleate.

Specific examples of the amides include acrylamide, N-methylacrylamide, N-ethylacrylamide, N-propylacrylamide, N-butylacrylamide, N-hexylacrylamide, N-octylacrylamide, N,N-dimethylacrylamide, N,N-diethylacrylamide, N,N-dipropylacrylamide, N,N-dibutylacrylamide, N,N-dihexylacrylamide, N,N-dioctylacrylamide, methacrylamide, N-methylmethacrylamide, N-ethylmethacrylamide, N-propylmethacrylamide, N-butylmethacrylamide, N-hexylmethacrylamide, N-octylmethacrylamide, N,N-dimethylmethacrylamide, N,N-diethylmethacrylamide, N,N-dipropylmethacrylamide, N,N-dibutylmethacrylamide, N,N-dihexylmethacrylamide, and N,N-dioctylmethacrylamide.

Specific examples of the ethers include methyl vinyl ether, ethyl vinyl ether, propyl vinyl ether, butyl vinyl ether, hexyl vinyl ether, octyl vinyl ether, octadecyl vinyl ether, and phenyl vinyl ether.

Specific examples of the acids include acrylic acid, methacrylic acid, crotonic acid, fumaric acid, maleic acid, itaconic acid.

Specific examples of the hydrocarbon compounds include styrene, norbornene, and butadiene, and further include acrylonitrile, methacrylonitrile, acrolein, crotonaldehyde, trimethoxyvinylsilane, vinyl chloride, and vinylidene chloride.

One or more of the above monomers may be selected as the third ingredient according to use of the laminate. The content of units derived from such third ingredient monomer(s) in the resulting polymer is not higher than 40% by weight. If the content exceeds 40% by weight, the inherent properties of polyethylene resins are impaired.

In order that the ethylene copolymer employed in this invention may exhibit the inherent properties of polyethylene, the total amount of units derived from the unsaturated carboxylic acid anhydride and units derived from the third ingredient monomer in the copolymer may preferably be not more than 50% by weight, more preferably not more than 40% by weight, based on the amount of the copolymer. It is preferable that the third ingredient monomer does not basically react with the unsaturated carboxylic acid anhydride described above. However, if the third ingredient monomer is used in an amount that is determined based on the stoichiometric amounts of all the monomers, the third ingredient monomer may be one which can react with the acid anhydride.

In the case that the laminate to be produced is for use in an application where good transparency is particularly required, it is preferable that the content of units derived from the third ingredient monomer be 3% by weight or more, more preferably 5% by weight more, most preferably 10% by weight or more, in order to decrease the crystallizability of the polyethylene.

If the laminate to be produced is for use in fields where oil resistance is required, such as in the field of industrial materials, a highly polar monomer is preferably used for the third ingredient monomer. Specific examples of such preferred monomers include acrylonitrile, acrylamide, acrylic acid, and acrylic esters.

For use in the field of food wrapping or packaging, materials are strongly required to be odorless and tasteless as well as hygienic. For this reason, since the odor of the ethylene copolymer of this invention depends on the kind of the third ingredient monomer and also on the amount of the monomer remaining in the copolymer, the content of units derived from the third ingredient monomer in the copolymer should be not higher than 10% by weight, although unable to be specified unconditionally. Normally, the content of such units in the copolymer for use in food wrapping or packaging materials is 5% by weight or less, preferably 3% by weight or less and more preferably 2% by weight or less. If the laminate is for use in a field where an exceedingly odorless and tasteless nature is required, it is desirable that the third ingredient should contain no comonomer which is strongly odorous, such as an ester, or the content of units derived from such an odorous comonomer in the copolymer should be reduced to 1% by weight or less. The reason why such comonomers may cause odors is that the comonomers are apt to give oligomers etc. in the polymerization system and such oligomers are strongly odorous and are difficult to remove in a separation step.

The unsaturated carboxylic acid anhydride may be used in copolymerization in such an amount that the content of units derived from the acid anhydride in the resulting copolymer is in the range of from 0.01 to 20% by weight. If the content of the acid anhydride units in the copolymer is below 0.01% by weight, the copolymer gives laminates having poor interlaminar adhesion and, prone to suffer lamina separation. On the other hand, if the content of the acid anhydride units in the copolymer exceeds 20% by weight, the inherent properties of polyethylene resins are impaired. The preferred range of the content of the acid anhydride units in the copolymer is from 0.1 to 10% by weight.

It is particularly preferable that in preparing the thermoplastic resin composition, which is to be employed in the laminate of this invention, by use of the ethylene copolymer described above, both of the amount of the ethylene copolymer in the composition and the content of units derived from the unsaturated carboxylic acid anhydride in the ethylene copolymer be regulated such that the content of units derived from the unsaturated carboxylic acid anhydride in the composition is not less than 0.1% by weight. If the content of such units in the composition is below 0.1% by weight, extrusion laminating of this composition at a low temperature may yield laminates that are insufficient in the adhesion between the composition layer and the substrate.

The copolymer of ethylene and the unsaturated carboxylic acid anhydride may be produced by the bulk, solution, suspension or emulsion polymerization process, or other processes. Most common of these is the bulk copolymerization process, in which a copolymer is produced by means of radical polymerization under a pressure of 700 to 3,000 atm at a temperature of 100° to 300° C. The preferred range of the pressure may be from 1,000 to 2,500 atm, while that of the temperature may be from 150° to 270° C. in terms of the average temperature in the reactor. If the pressure is below 700 atm, the resulting polymer cannot have a sufficiently high molecular weight, so that the polymer is poor in formability and physical properties. Pressures exceeding 3,000 atm are virtually meaningless and only result in increased production costs. If the temperature is below 100° C., the polymerization reaction cannot proceed stably and is also economically disadvantageous because conversion to polymer is low. If the temperature exceeds 300° C., not only the resulting polymer cannot have a sufficiently high molecular weight, but the reaction cannot be carried under control in some cases.

In performing the polymerization, the facilities and techniques usually employed for the production of high-pressure-process low-density polyethylene can basically be utilized. As a reactor, an autoclave-type or tubular reactor equipped with a stirrer can be used. If desired and necessary, multi-stage polymerization may be conducted with a plurality of reactors being connected in series or arranged in a row. In the case of an autoclave-type reactor, it is also possible to attain more strict control of the reaction temperature with variations, by dividing the inside of the reactor into plural zones. Ethylene and a radical-polymerizable acid anhydride both of which have been compressed to 1,000 atm or more are injected into the reactor and polymerized by the action of a free-radical initiator, such as organic peroxides, which has been injected into the reactor through other piping, thereby obtaining a copolymer.

As the free-radical initiator, a compound that generates a free radical is used; organic peroxides are mainly employed. Examples of the free-radical initiator include dialkyl peroxides such as di-t-butyl peroxide, dicumyl peroxide, and di-t-butyl cumyl peroxide; acyl peroxides such as acetyl peroxide, isobutanoyl peroxide, and octanoyl peroxide; peroxydicarbonates such as diisopropyl peroxydicarbonate and di-2-ethylhexyl peroxydicarbonate; peroxyesters such as t-butyl peroxypivalate and t-butyl peroxylaurate; ketone peroxides such as methyl ethyl ketone peroxide and cyclohexanone peroxide; peroxyketals such as 1,1-bis(t-butylperoxy)cyclohexane and 2,2-bis(t-butylperoxy)octane; hydroperoxides such as t-butyl hydroperoxide and cumene hydroperoxide; azo compounds such as 2,2-azobisisobutyronitrile; and oxygen.

In performing the polymerization, various kinds of chain transfer agents can be used as a molecular weight regulator. Examples of such chain transfer agents include olefins such as propylene, butene, and hexene; paraffins such as ethane, propane, and butane; carbonyl compounds such as acetone, methyl ethyl ketone, and methyl acetate; and aromatic hydrocarbons such as toluene, xylene, and ethylbenzene.

The copolymer obtained by the polymerization method described above is discharged from the reactor along with the monomers remaining unreacted. This reaction mixture may be passed through a high pressure separator, or sometimes a moderate or low pressure separator, to separate the polymer from the monomers and low molecular weight polymers. The purified polymer may be then pelletized by means of an extruder, while the unreacted monomers may be reused after the low molecular weight polymers are removed therefrom by filtration. Before the pelletizing, various additives such as those mentioned later may be incorporated in the polymer.

The melt flow rate of the ethylene copolymer to be employed in this invention is not particularly limited as long as it is in the range of from 0.1 to 500 g/10 min when measured at 190° C. according to Japanese Industrial Standard (JIS) K-6760. Preferably, however, the melt flow rate (MFR) is 300 g/10 min or less. Even if the MFR is more than 300 g/10 min, the ethylene copolymer can be used after being diluted with a polyolefin resin which contains no units derived from an unsaturated carboxylic acid anhydride. If used like this, an ethylene copolymer having an MFR exceeding 300 g/10 min causes no problem. In the case where a thermoplastic resin composition prepared using the ethylene copolymer is subjected to extrusion laminating, the MFR of the ethylene copolymer is preferably in the range of from 1 to 80 g/10 min. If the MFR is below 1 g/10 min, there is a difficulty in performing extrusion laminating at low temperatures. If the MFR exceeds 80 g/10 min, the thermoplastic resin composition also has poor formability because of insufficient melt tension.

The polyolefin resin used above for dilution has a maximum peak of melting point at a temperature higher than 80° C. when measured by a differential scanning calorimeter (DSC) and may be selected from various kinds of polyolefin resins according to end uses, and ethylene-based polymers are preferred. Exemplary polyolefin resins include high-pressure-process low-density polyethylene, high-pressure-process copolymers of ethylene and a comonomer such as vinyl acetate, ethyl (meth)acrylate, glycidyl (meth)acrylate, or (meth)acrylic acid, straight-chain low-density polyethylene, high-density polyethylene, medium-density polyethylene, polypropylene, polybutene, and a block or random copolymer of propylene and either of ethylene an α-olefin (e.g., butene-1 hexene-1, octene-1, 3-methylbutene-1, or 4-methylpentene-1).

Although the ethylene copolymer described above and a blend thereof with the polyolefin resin have properties basically similar to those of ordinary polyolefin resins, they show, when processed at low temperatures, excellent adhesion to metal or paper substrates, synthetic resin substrates, or other substrates, and also are less odorous after being processed into laminates, so that they are suited for use in the production of laminates to be used as wrapping or packaging materials required to have no flavor.

In particular, in the case where the ethylene copolymer is a high-pressure-process random copolymer which is a radical copolymer of ethylene and a radical-polymerizable acid anhydride (and other polymerizable monomers), desired laminates can be produced efficiently by subjecting the ethylene copolymer to extrusion laminating in which the copolymer is extrusion-coated on a substrate at a temperature not higher than 280° C.

By contrast, in the case of so-called graft copolymers such as those obtained by modifying polyethylene with an acid anhydride with the aid of a free-radical initiator, laminates having sufficient interlaminar adhesion strengths cannot be obtained by extrusion laminating, except co-extrusion laminating, because the grafted amount cannot be increased so greatly in such a so-called graft copolymer (since too large a grafted amount causes gelation, resulting in poor film appearance).

The proportion of the ethylene copolymer to the polyolefin resin in the blend thereof varies depending on the amount of the acid anhydride units in the copolymer. However, the amount of the ethylene copolymer in the blend may be generally 1% by weight or more, preferably 3 to 70% by weight, more preferably 5 to 50% by weight.

For blending the ethylene copolymer with the polyolefin resin, various kinds of mixing apparatuses conventionally used for thermoplastic resin blending may be utilized, such as extruders of various types, a Banbury mixer, a kneader, rolls, etc.

If required, it is possible to dryblend both ethylene copolymer and polyolefin resin and directly subject this blend to a laminating machine without melt blending. Various kinds of additives and other ingredients described later may be incorporated in the ethylene copolymer described above and the blend of the copolymer with the polyolefin resin, as long as the additives etc. used do not impair the features of the copolymer.

As the lamina, i.e., substrate, to be in contact with a lamina of the ethylene copolymer, various materials such as metals, plastics, and paper can be employed. Examples of the substrate to which the ethylene copolymer is laminated to produce a laminate include a plate or foil of a metal such as iron, copper, tin-plated steel, aluminum, or stainless steel; a film (including oriented film and metal-deposited film), sheet, or nonwoven fabric of a plastic such as polyethylene, polypropylene, polystyrene, a nylon, a polyester, cellophane, an ethylene-vinyl alcohol copolymer, or poly(vinylidene chloride); and paper such as wood-free paper, kraft paper, or glassin paper.

In performing the extrusion laminating of the ethylene copolymer described above or a blend thereof with the polyolefin resin, various types of laminating techniques such as those described hereinabove can be used.

Extrusion laminating in this invention means a laminate-producing process which employs an extruder and a T-die and in which a film of a thermoplastic resin melt is laminated to or coated on a substrate and the resulting laminate is withdrawn while being cooled. It is possible to simultaneously coat one or more kinds of resins on a substrate by use of a plurality of extruders and a co-extrusion T-die.

The extrusion laminating further includes sandwich laminating in which substrates of one or more kinds are used and a resin is extruded between the substrates, tandem laminating in which two or more extruders with T-dies are arranged in series to produce multilayer laminates, and similar techniques.

It is essential that the temperature for the extrusion laminating (the temperature of the resin directly under the die) should be not higher than 280° C., preferably not higher than 260° C., but not lower than 220° C., for the purpose of preventing the laminate from deteriorating in odorless properties due to heat during the processing. Such low temperatures are important in order to obtain laminates suited for use as wrapping or packaging materials for foods.

The laminate obtained by the method described above has good interlaminar bonding strength as well as good appearance, odorless properties, etc. Therefore, the laminate can be used in a variety of applications as various kinds of wrapping or packaging materials and containers, particularly as wrapping or packaging materials required to have no flavor.

As another embodiment of the present invention, by use of a thermoplastic resin composition prepared by incorporating a flexible resin into the ethylene copolymer described above or into a blend of the copolymer with a polyolefin resin, there can be obtained a laminate which shows tenacious interlaminar adhesion without the aid of an adhesive and which is useful not only as a wrapping or packaging material for foods and industrial materials but also in the field of automotive materials.

In the thermoplastic resin composition employed in this invention in which a flexible resin has been incorporated, the content of the ethylene copolymer is 10 to 95% by weight. The preferred range of the content of the ethylene copolymer in the composition is difficult to specify in general, because it varies depending on the use of laminates to be produced and also on laminate-producing methods, substrates, etc. However, the preferred range of the content thereof for a laminate for particular use can be easily determined experimentally. In general, ethylene copolymer contents below 10% by weight result in laminates having insufficient interlaminar bonding strengths. Preferably, the content of the ethylene copolymer is from 20 to 90% by weight, with the especially preferred range thereof being from 30 to 85% by weight.

The flexible resin to be incorporated in the thermoplastic resin composition employed in this invention has an MFR as measured at 190° C. in accordance with JIS-K-6760 of from 0.1 to 1,000 g/10 min. If the MFR is below 0.1 g/10 min, use of such a flexible resin is disadvantageous in that the dispersion of ingredients in preparing the thermoplastic resin composition to be employed in this invention is difficult and, hence, not only the final laminate has a poor appearance, but the composition layer in the laminate has an insufficient strength, so that the laminate is prone to undergo failure of the composition layer when peeled. On the other hand, a flexible resin having an MFR exceeding 1,000 g/10 min is disadvantageous in that it is poor in compatibility with the above-described ethylene copolymer and/or polyolefin resin and that such flexible resin, which is a low molecular weight resin, may gather near the laminar interfaces when used to produce laminates, resulting in impaired interlaminar bonding strengths. The preferred range of the MFR of the flexible resin is from 0.3 to 300 g/10 min.

It is thought that the flexible resin serves to absorb the warpage of the thermoplastic resin composition, when the composition is processed into a laminate of this invention, or to moderate the transmission of peel stress imposed on the laminate to the laminar interface, thereby imparting good interlaminar bonding strength to the laminate. Therefore, the flexible resin is preferably one which is softer than the ethylene copolymer described above.

The flexible resin has a maximum peak of melting point at a temperature of 80° C. or lower when measured by DSC, and examples include styrene-butadiene rubber, acrylonitrile-butadiene rubber, butyl rubbers, chloroprene rubber, silicone rubbers, acrylic rubbers, urethane rubbers, polybutadiene rubber, ethylene-$\alpha$-olefin rubbers (e.g., ethylene-propylene rubber), ethylene-$\alpha$-olefin-diene terpolymers (e.g., ethylene-propylene-diene terpolymers), polyisobutylene rubber, and polybutene-1 rubber. In particular, low-crystallinity polyethylene (sometimes called ULDPE or VLDPE) is preferably used which is a copolymer rubber of ethylene and an $\alpha$-olefin (e.g., propylene, butene-1, 4-methylpentene-1, octene) produced by an application of the producing technique for linear low-density polyethylene (sometimes called LLDPE) and which has a lower density than the ordinary low-density polyethylene. Preferably, the densities of such ethylene-$\alpha$-olefin copolymer rubbers are 0.90 g/cc or less. Furthermore, high-pressure-process ethylene copolymer rubbers produced by copolymerizing ethylene with various radical-polymerizable monomers by the high pressure process to decrease the crystallinity of polyethylene may be used as the flexible resin.

The content of units derived from the radical-polymerizable comonomer in the above high-pressure-process ethylene copolymer rubber may be generally 10% by weight or higher, preferably 15% by weight or higher. Examples of such ethylene copolymer rubbers include ethylene-vinyl acetate copolymer rubbers, ethylene-ethyl acrylate copolymer rubbers, and ethylene-butyl acrylate copolymer rubbers.

In the field of food wrapping and packaging, rubber copolymers of ethylene and one or more $\alpha$-olefins such as propylene, butene-1, and 4-methylpentene-1 are particularly superior in hygienic nature. From the standpoints of compatibility with the ethylene copolymer described hereinabove, hygienic nature, cost, etc., a copolymer rubber of ethylene and an $\alpha$-olefin having carbon atoms not less than those in butene-1 is particularly preferred as the flexible resin. In the field of wrapping or packaging of industrial materials, the ethylene-$\alpha$-olefin-diene terpolymer mentioned above is superior as the flexible resin. These ethylene-$\alpha$-olefin copolymer flexible resins are preferably ones in which the content of components having a molecular weight of less than 2,000 is 0.2% by weight or less.

In the thermoplastic resin composition employed in the laminate of this invention, the content of such flexible resin incorporated therein is 70 to 5% by weight. The flexible resin content for a particular use of the laminate is determined upon consideration of the effect of improving the bonding strength between both resins in the laminate, practical properties of the laminate, formability, etc. If the amount of the flexible resin incorporated in the composition exceeds 70% by weight, good properties characteristic of polyolefins, such as formability, nerve, and heat resistance, are lost. If the flexible resin content is below 5% by weight, interlaminar adhesion is impaired. Preferably, the content of the flexible resin in the thermoplastic resin composition is from 50 to 10% by weight, with the particularly preferred range thereof being from 40 to 15% by weight.

The thermoplastic resin composition described above is laminated to one or more kinds of substrates selected from thermoplastic resins, metals, papers, and fabrics. Examples of the thermoplastic resin for substrate include polyolefins, polystyrene resins, halogenated vinyl resins (e.g., vinyl chloride resins), polyesters, polyamides, and ethylene-vinyl acetate copolymers or saponified products thereof. In the case where oil resistance and gas barrier properties are particularly required, polyesters, polyamides, poly(vinylidene chloride), or saponified ethylene-vinyl acetate copolymers are preferred as substrate. In the case where high strengths are required, polyolefins, polystyrene resins, polyesters, polyamides, saponified ethylene-vinyl acetate copolymers and poly(vinylidene chloride) or other vinyl chloride resins are preferred as substrate. Thus, laminates having a well balanced combination of properties can be obtained by laminating polyolefins or the like, which are poor in gas (especially oxygen) barrier properties although excellent in processability, strength, hygienic nature, etc., to the above gas barrier resins.

Specific examples of the polyolefins and polystyrene resins employed in this invention as substrate include polyethylene, polypropylene, polyisoprene, polybutene, poly(3-methylbutene-1), poly(4-methylpentene-1), polybutadiene, polystyrene, copolymers consisting of units of two or more kinds of those contained in the above-mentioned polymers, such as ethylene-propylene copolymers, low-density linear polyethylene produced using butene-1, 4-methylpentene-1, hexene-1, octene-1, or the like as a comonomer, propylene-ethylene block copolymers, styrene-butadiene copolymers, and mixtures, graft polymers, crosslinked polymers, or block copolymers obtained from the above resins).

Ethylene-vinyl acetate copolymers and wholly or partly saponified ethylene-vinyl acetate copolymers may also used. From the viewpoints of gas barrier properties, oil resistance, and water vapor transmission characteristics although their chemical compositions are not specified, those obtained by saponifying ethylene-vinyl acetate copolymers having ethylene contents of 20 to 50 mol % to have saponification degrees of 93% of higher, preferably 96% or higher are preferred. Further, copolymers which are the same as the above ethylene-vinyl acetate copolymers except that a monomer such as a (meth)acrylate, styrene, or the like has been copolymerized therewith in an amount of 5 mol % or less may also be used after being saponified likewise.

Halogenated vinyl resins include vinyl chloride resins (e.g., poly(vinylidene chloride) and poly(vinyl chloride)), poly(vinyl fluoride), poly(vinylidene fluoride), polychloroprene, and chlorinated rubbers.

Preferred polyamide resins are linear polymers having an acid amide bond and obtained by (1) condensation of a diamine and a dicarboxylic acid, (2) condensation of an amino acid, or (3) ring opening of a lactam. Examples thereof include nylon-6, nylon-6,6, nylon-11, nylon-12, and nylon copolymers.

Preferred polyester resins are those obtained by condensation of saturated dibasic acids and glycols. Examples thereof include poly(ethylene terephthalate) obtained from ethylene glycol and terephthalic acid; poly(ethylene terephthalate) copolymers produced by use of a saturated dibasic acid comonomer such as phthalic acid, isophthalic acid, sebacic acid, adipic acid, azelaic acid, glutaric acid, succinic acid, or oxalic acid; poly(ethylene terephthalate) copolymers produced by use of a diol comonomer such as 1,4-cyclohexanedimethanol, diethylene glycol, or propylene glycol; mixtures thereof; and poly(butylene terephthalate).

Polymers of unsaturated carboxylic acids or derivatives thereof (e.g., poly(methyl methacrylate), poly(alkyl acrylate), polyacrylonitrile, and copolymers of monomers that are the same as those used for producing the above polymers and other monomers, such as acrylonitrile-styrene copolymers, ABS resins, ethylene-alkyl acrylate copolymers, ethylene-glycidyl methacrylate copolymers, ethylene-methacrylic acid copolymers, and ionically crosslinked products obtained from these polymers); polyacetals; polycarbonates; poly(phenylene oxide); and polysulfones may also be used as the thermoplastic resin.

Examples of the substrate metal include iron, aluminum, copper, and stainless steel. A substrate prepared by depositing a metal on the surface of a resin may also be employed. The metal may be in the form of a plate, foil, rod, tube, line, or powder or other forms.

Examples of the substrate paper include wood-free paper, kraft paper, paperboard, glassine paper, and Japanese paper.

Examples of the substrate fabric include organic or inorganic woven or nonwoven fabrics.

The melt laminating of the thermoplastic resin composition described hereinabove to the thermoplastic resin substrate may be carried out by the in-die laminating method or the out-of-die laminating method. Alternatively, the heat lamination method in which a preformed thermoplastic resin composition film is melt-adhered, with application of pressure, to a substrate by means of a heated roll, a hot press, or the like may be utilized in some cases.

If required and necessary, known additives and other ingredients may be incorporated into the thermoplastic resin composition to be used for producing the laminate of this invention. Additives that can react with the acid anhydride groups, which are reactive groups, contained in the ethylene copolymer in the thermoplastic resin composition may be utilized from the standpoint of stoichiometry with the reactive groups. Examples of additives and other ingredients include antioxidants (heat stabilizers), ultraviolet absorbers (light stabilizers), antistatic agents, anti-fogging agents, flame retardants, lubricants (slip agents, anti-blocking agents), inorganic or organic fillers, reinforcing materials, colorants (dyes, pigments), foaming agents, crosslinking agents, and perfumes.

Exemplary heat stabilizers include phenolic stabilizers, sulfur-containing stabilizers, and phosphorus-containing stabilizers. Specific examples of phenolic stabilizers are 2,6-di-t-butyl-4-methylphenol, stearyl-$\beta$-(3,5-di-t-butyl-4-hydroxyphenyl)propionate, 1-(4-hydroxy-3,5-di-t-butylaminophenyl)-3,5-dioctylthio-2,4,6-triazine, 2,2'-methylenebis(4-methyl-6-t-butylphenol), 2,2'-methylenebis(4-ethyl-6-t-butylphenol), 4,4'-thiobis(3-methyl-6-t-butylphenol), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tris(3,5-di-t-butyl-4-hydroxybenzyl) isocyanurate, and tetrakis[methylene-3-(3',5'-di-t-butyl-4-hydroxyphenyl)propionate]methane. Specific examples of sulfur-containing stabilizers are dilauryl thiodipropionate, distearyl thiodipropionate, and pentaerythritol tetralaurylthiopropionate. Specific examples of phosphorus-containing stabilizers are tris(nonylphenyl) phosphite, distearylpentaerythritol diphosphite, tetra(tridecyl)-1,1,3-tris(2-methyl-5-t-butyl-4-hydroxyphenyl)butane diphosphite, tetrakis(2,4-di-t-butylphenyl)-4,4'-biphenylene diphosphite, and 9,10-dihydro-9-oxa-10-phosphaphenanthrene 10-oxide.

Exemplary light stabilizers include salicylic acid-type, benzophenone-type, and benzotriazole-type stabilizers. Specific examples of salicylic acid-type stabilizers are phenyl salicylate, p-octyl salicylate, monoglycol salicylate, and p-t-butyl salicylate. Specific examples of benzophenone-type stabilizers are 2,4-dihydroxybenzophenone, 2-hydroxy-4-methoxybenzophenone, 2,2'-dihydroxy-4-methoxybenzophenone, 2-hydroxy-4-n-octyloxybenzophenone, 2-hydroxy-4-octadecyloxybenzophenone, and 2-hydroxy-4-dodecyloxybenzophenone. Specific examples of benzotriazole-type stabilizers are 2-(2'-hydroxy-5'-methylphenyl)benzotriazole and 2-(2'-hydroxy-4'-n-octyloxyphenyl)benzotriazole. In addition, resorcinol monobenzoate and similar compounds may be used.

Examples of antistatic agents and anti-fogging agents include esters such as pentaerythritol monostearate, glycerol monostearate, glycerol distearate, trimethylolpropane monostearate, sorbitan monopalmitate, and polyethylene glycol monostearate; sulfated compounds such as sodium lauryl sulfate, lauryl chlorosulfonate, sulfated oleic acid, and sodium dodecylbenzenesulfonate; phosphated compounds such as monooleyl phosphate, dioleyl phosphate, monolauryl phosphate, dilauryl phosphate, monocetyl phosphate, dicetyl phosphate, monononylphenyl phosphate, and dinonylphenyl phosphate; amides such as N-methyl-N-(sodium acetate)-(oleic amide) and N,N-diethanol(lauric amide); quaternary ammonium salts such as lauryltrimethylammonium chloride, lauryldimethylbenzylammonium chloride, lauryldiethanolmethylammonium chloride, and stearyltrimethylammonium methosulfate; betaines such as stearyldimethylbetaine, lauryldihydroxybetaine, and lauryldimethylsulfobetaine; and nonionic antistatic agents of the poly(ethylene glycol) type.

Examples of flame retardants include halogencontaining flame retardants such as chlorinated paraffins, chlorinated polyethylene, chlorendic anhydride, tetrabromobisphenol A, tetrabromophthalic anhydride, and dibromodichloropropane; phosphorus-containing flame retardants such as tris(chloroethyl) phosphate, bis(chloropropyl) chloroethyl phosphate, and other phosphoric esters; and flame retardants containing no halogen such as antimony oxide and magnesium hydroxide.

Examples of lubricants (inclusive of slip agents, antiblocking agents, and the like) include hydrocarbons such as liquid paraffin, natural paraffin, micro wax, synthesized waxes, and low molecular weight polyethylene; fatty acids such as stearic acid; fatty acid amides and alkylenebisfatty acid amides such as stearamide, palmitamide, methylenebisstearylamide, ethylenebisstearylamide, and oleamide; esters such as lower alcohol esters of fatty acids (e.g., butyl stearate), polyhydric alcohol esters of fatty acids, and polyglycol esters of fatty acids; alcohols such as aliphatic alcohols, polyhydric alcohols, and polyglycols; and metallic soaps.

Examples of fillers include carbon black, white carbon, calcium carbonate, basic magnesium carbonate hydrate, clay, silicate minerals, natural silicates, hydrated alumina, barium sulfate, calcium sulfate, metal powders, and organic fillers (e.g., wood flour, powdered nutshells, and cellulose). Examples of reinforcing materials include asbestos, glass fibers, carbon fibers, stainless-steel fibers, aluminum fibers, potassium titanate fibers, aramide fibers, glass beads, and aluminum flakes.

Examples of colorants (dyes and pigments) include titanium oxide, zinc oxide, barium sulfate, carbon black, aniline black, white lead, cadmium yellow, yellow lead, zinc chromate, yellow ocher, Hansa Yellow, red iron oxide, Lithol Red, Alizarine Lake, cadmium red, redocher rouge, quinacridone red, cobalt violet, ultramarine, cobalt blue, phthalocyanine blue, phthalocyanine green, chrome green, aluminum powder, and bronze powder.

Examples of foaming agents include inorganic foaming agents such as ammonia carbonate, sodium hydrogen carbonate, and sodium nitrite; nitroso compound foaming agents such as dinitrosopentamethylenetetramine and dimethyldinitrosoterephthalamide; sulfohydrazide-type foaming agents such as benzenesulfonyl hydrazide, p-toluenesulfonyl hydrazide, p,p'-oxybis(-benzenesulfonyl hydrazide), and disulfone hydrazide diphenyl sulfone; and azo compound foaming agents such as azobisisobutyronitrile and azodicarbonamide.

As crosslinking agents, various peroxides may be used such as those mentioned hereinabove as free-radical polymerization initiators. In addition to such a crosslinking agent, a crosslinking auxiliary may be used, whereby crosslinking efficiency can be heightened. Examples of the crosslinking auxiliary include methacrylate-type compounds such as lauryl methacrylate, ethylene glycol dimethacrylate, and trimethylolpropene trimethacrylate; allyl group-containing compounds such as diallyl fumarate, diallyl phthalate, and triallyl isocyanurate; quinonedioxime-type compounds such as p-quinonedioxime and dibenzoylquinonedioxime; and other compounds such as divinylbenzene, vinyltoluene, and 1,2-polybutadiene.

The ethylene copolymer in the thermoplastic resin composition may be crosslinked by various chemical methods utilizing the acid anhydride group characteristic of the ethylene copolymer. Further, the crosslinking may also be accomplished by methods which utilize high-energy ionizing radiation (electron rays, X-rays, γ-rays, etc.) without using such crosslinking agents.

Examples of perfumes include natural perfumes such as musk, civet, castoreum, and amber gris, various synthetic perfumes, and masking agents.

The above-described additives may be incorporated in the ethylene copolymer when the copolymer produced is pelletized, as described hereinabove, in the polymerization line. Normally, however, pellets of the ethylene copolymer and additives are melt-kneaded by means of a Banbury mixer, rollers, an extruder selected from various kinds, etc., as has conventionally been performed. If desired and necessary, it is possible to dryblend the pellets with additives and then directly subject the blend to a laminating machine.

The present invention will be explained below in more detail by reference to the following examples, but it should be understood that the invention is not limited to these examples and various modifications may be made.

EXAMPLE 1

Using high pressure process polyethylene-manufacturing facilities having a tank-type reactor, a copolymer of ethylene and maleic anhydride was produced as follows. This polymerization was performed under a pressure of 1,850 kg/cm$^2$ at a temperature of 200° C. Maleic anhydride was dissolved in methyl ethyl ketone at a concentration of about 30%, and the resulting solution was forced into the intake line of a secondary compressor by means of a high-pressure pump. t-Butyl peroxypivalate was used as an initiator. The polymer produced was passed from the reactor through a high-pressure and low-pressure separator, where monomers remaining unreacted were separated, and was then formed into pellets by means of a extruder-pelletizer. The thus-obtained copolymer had an MFR (190° C.) of 8.6 g/10 min and the content of maleic anhydride units in the copolymer was 2.2% by weight; the composition of the copolymer was determined by infrared spectroscopy. The copolymer obtained above was blended with low-density polyethylene having an MFR (190° C.) of 7.0 g/10 min and a density of 0.9165 g/cc in a ratio of 20/80 by weight. The blending was accomplished by dryblending both by means of a tumbler and melt-kneading the resulting mixture at 170° C. by means of a 50-mmφ single-screw extruder, the resulting composition being then pelletized. The composition thus obtained had an MFR (190° C.) of 7.3 g/10 min and the content of maleic anhydride units in the composition was 0.43% by weight.

The composition obtained above was laminated to a 30 μm-thick aluminum foil by means of a laminator comprising a 90-mmφ extruder and a die having an opening width of 750 mm. The laminating was performed at an extrusion temperature of 250° C., a screw speed for the extruder of 60 rpm, and a laminate-withdrawing speed of 80 m/min. The thus-produced laminate had a total thickness of 60 μm.

The laminate obtained above was aged for 24 hours in an atmosphere having a temperature of 23° C. and a relative humidity of 50%, then cut into strips 15 mm wide, and evaluated for interlaminar adhesion in terms of 180° peel strength. The peel test was conducted at a peel rate of 300 mm/min. As a result, the laminate had a peel strength of 400 g/15 mm-width, showing excellent interlaminar adhesion. The laminate was then cut into an appropriate size and a sealed bag (having an internal volume of about 500 cc) was made therefrom, with the resin layer being faced inward. This bag was heated at 40° C. for 30 minutes, opened, and then organoleptically evaluated for odor. This organoleptic test was made by a panel of six testers selected beforehand, in terms of relative evaluation with a bag of the same size made of low-odorous low-density polyethylene (L156 manufactured by Showa Denko K. K., Japan; formed into film at 310° C.), which has been practically employed as a food wrapping or packaging material, and heat-treated likewise being used as a control.

Of the six testers, five judged that the laminate according to the present invention was less odorous, and one judged that the two samples were equal in odor to each other.

The above results show that the laminate of this invention is a good laminate which can be used in various applications.

EXAMPLE 2

An ethylene/maleic anhydride copolymer was produced in the same manner as in Example 1 except that the polymerization temperature was 230° C. and t-butyl peroxy-2-ethylhexanoate was used as an initiator. The ethylene/maleic anhydride copolymer thus obtained, which had an MFR (190° C.) of 105 g/10 min and a maleic anhydride unit content of 1.5% by weight, was blended in the same manner as in Example 1 with low-density linear polyethylene having an MFR (190° C.) of 5.0 g/10 min and a density of 0.9220 g/cc and an ethylene/propylene copolymer having a propylene content of 32% by weight and an MFR (230° C.) of 1.8 g/10 min, in a ratio of 10/70/20 by weight. The composition thus obtained had an MFR (190° C.) of 5.8 g/10 min and a maleic anhydride unit content of 0.16% by weight.

Using this composition, a laminate was produced in the same manner as in Example 1 except that the laminating temperature was 280° C. This laminate was evaluated for the adhesion of the resin layer to the aluminum foil and for odor in the same manner as in Example 1. As a result, the laminate had a peel strength of 380 g/15 mm-width and was found to be almost equal in odor to the L156 laminate specified in Example 1. Accordingly, the laminate obtained above was a good one which can be used in various applications.

EXAMPLE 3

A copolymer of ethylene and itaconic anhydride was produced in the same manner as in Example 1 except that itaconic anhydride was introduced into the reaction system in the form of an acetone solution. The thus-obtained copolymer had an MFR (190° C.) of 12 g/10 min and an itaconic anhydride unit content of 0.85% by weight.

The copolymer obtained above was extrusion-coated at 260° C. on a 20-μm-thick poly(ethylene terephthalate) film in the same manner as in Example 1, thereby obtaining a laminate. This laminate was evaluated for interlaminar adhesion and odor according to the methods described in Example 1. As a result, the laminate had a peel strength of 340 g/15 mm-width and was found to be equal in odor to the L156 laminate.

COMPARATIVE EXAMPLE 1

L156 only was laminated at 310° C. to an aluminum foil to produce a laminate. The resin layer of this laminate showed insufficient adhesion to the aluminum foil (140 g/15 mm-width) although the laminating temperature was as high as 310° C. This indicates the necessity of use of an anchor coat. Subsequently, a laminate of the same construction was produced at an elevated temperature of 330° C. As a result, the laminate showed improved interlaminar adhesion (300 g/15 mm-width), but it had become strongly odorous due to deterioration by heat and, hence, was unusable as a wrapping or packaging material for foods. Furthermore, laminating was performed at a laminating temperature of 280° C., but the resin layer showed no adhesion to the aluminum foil.

EXAMPLE 4

Using a tumbler, 80 parts by weight of an ethylene/methyl methacrylate/maleic anhydride copolymer (weight ratio 89.6/7.6/2.8, MFR (190° C.) 8.3 g/10 min) and 20 parts by weight of an ethylene/propylene copolymer (weight ratio 70/30, MFR (190° C.) 1.1 g/10 min) were were dryblended. This blend was melt-kneaded at 160° C. and extruded into strands by means of an extruder having a diameter of 40 mmφ and an L/D of 28. The strands were water-cooled and then pelletized, thereby producing a thermoplastic resin composition (A). The formulation for this thermoplastic resin composition is shown in Table 1.

The thus-obtained thermoplastic resin composition (A) was co-extruded with a product of the saponification of an ethylene/vinyl acetate copolymer (vinyl acetate content 68 mol %) by means of a co-extrusion laminator. Thus, a T-die film consisting of two different layers was produced, with the copolymer layer as the substrate. The laminator used and laminating conditions were as follows.

An extruder of 40 mmφ for the thermoplastic resin composition (A) and another extruder of 45 mmφ for the ethylene/vinyl acetate copolymer were used for co-extrusion. The die width was 300 mm. The thickness of the extruded thermoplastic resin composition layer and that of the extruded ethylene/vinyl acetate copolymer layer were regulated at 30 μm and 40 μm, respectively, and laminate-withdrawing speed was 20 m/min. The temperatures of the composition and the copolymer were 180° C. and 220° C., respectively.

EXAMPLES 5 TO 16 AND COMPARATIVE EXAMPLES 2 TO 16

In the same manner as in Example 4, various thermoplastic resin compositions were prepared as shown in Table 1. The respective thermoplastic resin compositions were subjected to co-extrusion laminating, extrusion laminating, or press laminating to produce laminates.

The co-extrusion laminating was performed according to the method employed in Example 4.

The extrusion laminating was conducted using a 50-mmϕ extruder under conditions of; die width 400 mm, laminating thickness 30 μm, cooling roll temperature 25° C., laminate-withdrawing speed 100 m/min, and resin temperature 270° C.

The press laminating was performed using a pressing machine of 150° C. The composition was interposed between two substrates, preheated for one minute, and then pressed at 5 kg/cm² for one minute to produce a laminate.

COMPARATIVE EXAMPLE 17

A thermoplastic resin composition (M), the formulation for which is shown in Table 1, was prepared in the same manner as in Example 4. This thermoplastic resin composition (M) was poor in homogeneity, so that the laminate obtained using the composition had a very rough surface.

EXAMPLE 17 AND COMPARATIVE EXAMPLE 18

By blow molding, two laminates in a 500-ml cylindrical bottle form were produced. Each laminate had a five-layer structure consisting of three materials (polypropylene/ethylene-vinyl alcohol copolymer/thermoplastic resin composition/ethylene-vinyl alcohol copolymer/polypropylene). The extruders used were a 50-mmϕ extruder for the innermost and outermost layers, a 32-mmϕ extruder for the interlayers, and a 26-mmϕ extruder for the adhesive layer. The die diameter was 15.5 mm, the core diameter 14.0 mm, and the mold temperature 20° C.

The interlaminar bonding strength for each of the laminates obtained above was measured as follows. The laminate was cut into 1.5 cm-wide test pieces (the cutting being made in the direction of withdrawal in the case where the laminate had been produced by not pressing but laminating). The test pieces were aged for 24 hours in an atmosphere of 23° C. and 50% RH, and then subjected to a 180° peel test at a peel rate of 300 mm/min.

The odor of each thermoplastic resin composition was evaluated by a panel after pellets of the composition were kept in a sealed bag at 40° C. for 1 hour. The results of the odor evaluation for respective compositions are shown in five grades, i.e., 1: excellent (equal to ordinary polyethylene), 2: good (almost odorless), 3: medium (slightly odorous), 4: poor (odorous), and 5: very poor (terribly odorous).

Compositions of odor grades 1 and 2 and those of odor grade 3 are usable for wrapping or packaging materials for foods as inside layers and interlayers, respectively, while those of odor grades 4 and 5 are unsuited for food wrapping or packaging.

Clarity was evaluated by direct observation of each thermoplastic resin composition being formed into a 0.3 mm thick sheet by pressing. The results are shown in four grades, i.e., A: excellent, B: good, C: poor (semi-transparent), and D: very poor (opaque).

TABLE 1

| Thermoplastic resin composition | Ethylene copolymer Kind | wt % | Flexible resin Kind | wt % | Other ingredient Kind | wt % |
| --- | --- | --- | --- | --- | --- | --- |
| (A) | (a) | 80 | I | 20 | — | — |
| (B) | (b) | 70 | III | 30 | — | — |
| (C) | (c) | 85 | II | 15 | — | — |
| (D) | (d) | 80 | V | 20 | — | — |
| (E) | (e) | 50 | IV | 20 | LLD*1 | 30 |
| (F) | (f) | 80 | II | 20 | — | — |
| (G) | (g) | 40 | II | 15 | LD*2 | 45 |
| (H) | (d) | 50 | I | 20 | (h) | 30 |
| (I) | (c) | 30 | II | 20 | LLD*1 | 50 |
| (J) | (a) | 97 | I | 3 | — | — |
| (K) | (a) | 25 | I | 75 | — | — |
| (E') | (e) | 63 | — | — | LLD*1 | 37 |
| (G') | (g) | 47 | — | — | LD*2 | 53 |
| (H') | (d) | 63 | — | — | (h) | 37 |
| (I') | (c) | 37 | — | — | LLD*1 | 63 |
| (L) | (a) | 80 | VI | 20 | — | — |
| (M) | (a) | 80 | VII | 20 | — | — |

(Note)
*1LLD: linear low-density polyethylene (MFR (190° C.) 4.3 g/10 min, density 0.918 g/cm³)
*2LD: high-pressure-process low-density polyethylene (MFR (190° C.) 6.2 g/10 min, density 0.913 g/cm³)

The ethylene copolymers shown in Table 1 were produced by use of an autoclave-type reactor which had a capacity of 4 liters and the inside of which had been divided into two zones. The polymerizations were carried out at temperatures of 190° to 230° C. under pressures of 1,800 to 1,950 atm, with t-butyl peroxypivalate being used as an initiator. Unsaturated carboxylic acid anhydrides, other monomers, solvents, etc. were injected into the intake line of a second-stage compressor, and then fed to the first zone of the reactor.

From the copolymers produced, monomers remaining unreacted were separated by a high-pressure separator and a low-pressure separator, and the purified copolymers were formed into pellets by means of an extruder. The copolymers thus produced were listed below.

The composition of each copolymer was determined by using an infrared spectrophotometer and a $^{13}$C NMR spectroscope.

(a) Ethylene-methyl methacrylate-maleic anhydride copolymer (MFR (190° C.) 8.3 g/10 (the temperature and the unit are hereinafter the same and omitted), ethylene content 89.6 wt %, methyl methacrylate content 7.6 wt %, maleic anhydride content 2.8 wt %)

(b) Ethylene-ethyl acrylate-maleic anhydride copolymer (MFR 6.8, ethylene content 90.0 wt %, ethyl acrylate content 6.5 wt %, maleic anhydride content 3.5 wt %)

(c) Ethylene-itaconic anhydride copolymer (MFR 8.2, ethylene content 95.1 wt %, itaconic anhydride content 4.9 wt %)

(d) Ethylene-methyl acrylate-maleic anhydride copolymer (MFR 2.6, ethylene content 94.5 wt %, methyl acrylate content 1.8 wt %, maleic anhydride content 3.7 wt %)
(e) Ethylene-maleic anhydride copolymer (MFR 8.4, ethylene content 95.4 wt %, maleic anhydride content 4.6 wt %)
(f) Ethylene-N,N-dimethylacrylamide-maleic anhydride copolymer (MFR 7.4, ethylene content 87.9 wt %, N,N-dimethylacrylamide content 8.2 wt %, maleic anhydride content 3.9 wt %)
(g) Ethylene-ethyl acrylate-maleic anhydride copolymer (MFR 9.2, ethylene content 69.6 wt %, ethyl acrylate content 26.9 wt %, maleic anhydride content 3.5 wt %)
(h) Ethylene-methyl acrylate copolymer (MFR 10.2, ethylene content 91.2 wt %, methyl acrylate content 8.8 wt %) (used in Comparative Example 4)
(i) Ethylene-ethyl acrylate copolymer (MFR 9.5, ethyl acrylate content 10.2 wt %) (used in Comparative Example 14)
(j) High-pressure-process polyethylene (MFR 8.7, density 0.917 g/cc) (used in Comparative Example 15)

The following polymers were used as flexible resins.
(I) Ethylene-propylene copolymer
 (MFR 1.1, ethylene content 70 wt %)
(II) Ethylene-butene-1 copolymer
 (MFR 3.6, ethylene content 72 wt %)
(III) Ethylene-propylene-diene terpolymer
 (MFR 2.8, ethylene content 70 wt %, propylene content 18 wt %, ethylidenenorbornene content 12 wt %)
(IV) Ethylene-butene-1 copolymer
 (MFR 8.2, ethylene content 80 wt %, butene-1 content 20 wt %)
(V) Ethylene-vinyl acetate copolymer
 (MFR 5.5, ethylene content 60 wt %, vinyl acetate content 40 wt %)
(VI) Ethylene-propylene copolymer
 (MFR 1,500, ethylene content 70 wt %)
(VII) Ethylene-propylene copolymer
 (MFR 0.08, ethylene content 70 wt %)

The properties, i.e., the interlaminar bonding strength, order and clarity of the laminates obtained above are shown Table 2 below.

TABLE 2

| | Composition | Substrate | Laminating method | Peel strength g/15 mm | Odor | Clarity |
|---|---|---|---|---|---|---|
| Example 4 | (A) | EVOH | co-extrusion | 850 | 4 | B |
| Example 5 | (B) | nylon | " | 960 | 5 | A |
| Example 6 | (C) | EVOH | " | 780 | 2 | A |
| Example 7 | (D) | PS | " | 450 | 4 | A |
| Example 8 | (E) | EVOH | " | 720 | 2 | A |
| Example 9 | (E) | nylon | " | 880 | 2 | A |
| Example 10 | (E) | PP | " | 850 | 2 | A |
| Example 11 | (F) | Al | extrusion laminating | 500 | 3 | C |
| Example 12 | (G) | PET | extrusion laminating | 370 | 4 | A |
| Example 13 | (H) | OPP | extrusion laminating | 360 | 4 | A |
| Example 14 | (I) | EVOH | co-extrusion | 780 | 2 | A |
| Example 15 | (I) | wood-free paper | hot pressing | 510 | 2 | C |
| Example 16 | (I) | PET nonmoven fabric | hot pressing | 840 | 2 | C |
| Example 17 | (E) | EVOH | multilayer blowing | 1200 | 2 | A |
| Comparative Example 2 | (J) | EVOH | co-extrusion | 380 | 4 | A |
| Comparative Example 3 | (K) | EVOH | " | 340 | 3 | A |
| Comparative Example 4 | (h) | EVOH | " | 320 | 4 | A |
| Comparative Example 5 | (a) | EVOH | " | 340 | 4 | A |
| Comparative Example 6 | (b) | nylon | " | 400 | 5 | A |
| Comparative Example 7 | (c) | EVOH | " | 340 | 2 | A |
| Comparative Example 8 | (d) | PS | " | 120 | 4 | A |
| Comparative Example 9 | (E') | EVOH | " | 280 | 2 | A |
| Comparative Example 10 | (f) | Al | extrusion laminating | 210 | 3 | C |
| Comparative Example 11 | (G') | PET | extrusion laminating | 70 | 4 | A |
| Comparative Example 12 | (H') | OPP | extrusion laminating | 90 | 4 | A |
| Comparative Example 13 | (I') | EVOH | co-extrusion | 350 | 2 | A |
| Comparative Example 14 | (i) | EVOH | extrusion laminating | 140 | 5 | A |
| Comparative Example 15 | (j) | EVOH | extrusion laminating | 150 | 1 | A |
| Comparative Example 16 | (L) | EVOH | co-extrusion | 290 | 4 | B |
| Comparative | (M) | EVOH | " | 310 | 4 | B |

TABLE 2-continued

|  | Composition | Substrate | Laminating method | Peel strength g/15 mm | Odor | Clarity |
|---|---|---|---|---|---|---|
| Example 17 Comparative Example 18 | (E') | EVOH | multilayer blowing | 680 | 2 | A |

(Note)
(i) In Comparative Example 3, there was laminating difficulty because severe blocking occurred at the time of co-extrusion laminating.
(ii) EVOH: saponified ethylene-vinyl acetate copolymer
PS: polystyrene
PP: polypropylene
Al: aluminum foil
PET: poly(ethylene terephthalate)
OPP: biaxailly oriented polypropylene film.

As described above, the laminate of the present invention, which has been produced by laminating the specific thermoplastic resin composition as described hereinabove to one or more kinds of substrates selected from thermoplastic resins, metals, papers, and fabrics, shows tenacious interlaminar adhesion without the aid of a particular adhesive. By suitably selecting substrates to which the thermoplastic resin composition is to be laminated, there can be obtained laminates having desired properties, such as clarity, oil resistance, gas barrier properties, high strength, etc. Further, the laminates of this invention can be used for applications in many fields depending on the methods by which the laminates have been produced. For example, the laminates of this invention include those in the form of a mere film or a bag which have been produced by coextrusion laminating or extrusion laminating, thick laminates produced by hot press laminating, and those in the form of a container, tank, etc. which have been produced by multilayer blow molding. In particular, a laminate produced by laminating the specific thermoplastic resin composition to a barrier resin or aluminum foil shows good oil resistance and gas barrier properties and, hence, is suited for use in food containers or gasoline tanks, while a laminate produced by hot press-laminating the specific thermoplastic resin composition to a metal or a high-strength synthetic resin is suited for use as an automotive material etc. Accordingly, the present invention greatly contributes to cost reduction and labor saving owing to that specific thermoplastic resin composition employed in this invention which can be produced at low cost and has good formability and well-balanced properties.

While the invention has been described in detail and with reference to specific embodiments thereof, it will be apparent to one skilled in the art that various changes and modifications can be made therein without departing from the spirit and scope thereof.

What is claimed is:

1. A process for producing a laminate by means of extrusion laminating, which comprises extrusion-coating a thermoplastic resin composition comprising effective film-forming amounts of (1) an ethylene copolymer composed mainly of units derived from ethylene and units derived from a carboxylic acid anhydride and (2) a flexible resin having a maximum peak of melting point at a temperature of 80° or lower, directly onto a substrate at a temperature not higher than 280° C., wherein said ethylene copolymer and said flexible resin are different.

2. A process as claimed in claim 1, wherein said composition further contains a polyolefin resin.

3. A process as claimed in claim 1, wherein said carboxylic acid anhydride has a radical-polymerizable unsaturated bond.

4. A process as claimed in claim 1, wherein said ethylene copolymer contains the units derived from an unsaturated carboxylic acid anhydride in an amount of 0.01 to 20% by weight.

5. A process as claimed in claim 1, wherein said ethylene copolymer contains the units derived from an unsaturated carboxylic acid anhydride in an amount of 0.1 to 10% by weight.

6. A process as claimed in claim 1, wherein said ethylene copolymer has an MFR (190° C.) of 1 to 80 g/10 min.

7. A process as claimed in claim 1, wherein said flexible resin is selected from the group consisting of styrene-butadiene rubber, acrylonitrile-butadiene rubber, butyl rubbers, ethylene-alpha-olefin rubbers, chloroprene rubber, silicone rubbers, acrylic rubbers, urethane rubbers, polybutadiene rubber, ethylene-α-olefin-diene terpolymers, polybutene-1 rubber, low-crystallinity ethylene-α-olefin copolymer rubbers having a density of 0.90 g/cc or less, and high-pressure-process ethylene copolymer rubbers containing 10% by weight or higher of units derived from a radical-polymerizable comononer.

8. A process as claimed in claim 7, wherein said flexible resin is a high-pressure-process ethylene copolymer rubber containing 10% by weight or higher of units derived from a radical-polymerizable comononer and wherein said radical-polymerizable comononer is selected from the group consisting of vinyl acetate, ethyl acrylate, and butyl acrylate.

9. A process as claimed in claim 7, wherein said flexible resin is selected from the group consisting of low-crystallinity ethylene-α-olefin copolymer rubbers and high-pressure-process ethylene copolymer rubbers.

10. A process as claimed in claim 7, wherein said flexible resin has the density of 0.90 g/cc or less.

* * * * *